Patented Feb. 10, 1948

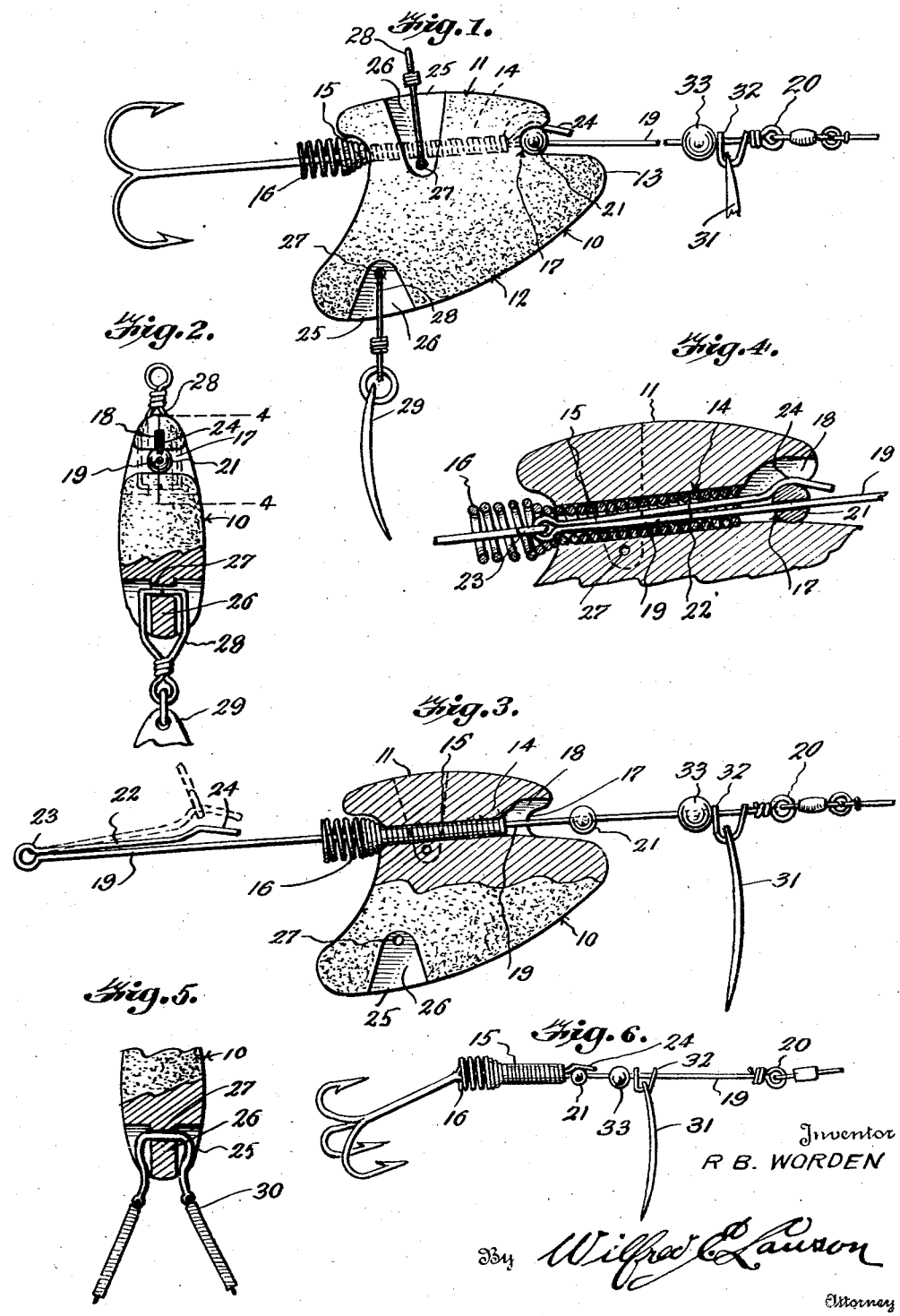

2,435,730

UNITED STATES PATENT OFFICE 2,435,730

CASTING SINKER

R. B. Worden, Granger, Wash.

Application June 17, 1944, Serial No. 540,825

10 Claims. (Cl. 43—42)

1

This invention relates generally to the class of fishing and trapping and pertains particularly to improvements in casting sinkers.

A principal object of the present invention is to provide a casting sinker having associated therewith in a novel manner a means for facilitating the attachment thereto of a plain hook, a fly, spoon or other type of lure.

Another object of the invention is to provide an improved casting weight or sinker having a wire shaft slidably extended therethrough, with means for locking such shaft against longitudinal movement with respect to the sinker, after a hook, fly or other type of lure has been attached to the shaft.

Still another object of the invention is to provide in a casting sinker carrying a shaft to which a lure may be attached, a novel means for securing the shaft against longitudinal movement and also for securing it against turning movement with respect to the sinker whereby the lure may be maintained in a desired predetermined position in the water.

Still another object of the invention is to provide a casting sinker having a novel means for attaching auxiliary lures thereto or for attaching weed guards or deflectors, as may be desired.

The invention will be best understood from a consideration of the following detailed description taken with the accompanying drawing forming a part of the specification, with the understanding that minor changes and modifications may be made in the invention so long as such changes or modifications mark no material departure from the salient features of the invention as expressed in the appended claims.

In the drawing:

Figure 1 is a view in side elevation of the device embodying the present invention.

Figure 2 is a view in front elevation, a portion being broken away.

Figure 3 is a view partly in side elevation and partly in longitudinal section showing the wire rod withdrawn from the removal of the hook.

Figure 4 is a longitudinal section substantially on the line 4—4 of Figure 2, on an enlarged scale centrally through the upper half of the device with certain of the parts in the position shown in Figure 1, the staple being omitted.

Figure 5 is a detail illustrating the application of a weed guard.

Figure 6 is a view illustrating the device as it may be used with a spinner and without the sinker.

Referring now more particularly to the draw-

2 ing the numeral 10 generally designates the weight or sinker body. As shown in Figure 2 this body is more or less elliptical in cross section and in side elevation it presents a relatively straight top edge 11, with a rounded lower edge 12 and a round pointed forward end 13.

In accordance with the present invention there is formed longitudinally through the body of the sinker in the central longitudinal plane thereof and adjacent the top edge 11, the passage or opening 14 in which is fixed in any suitable manner, as, for example, by friction, a spiral sleeve 15 which extends beyond the rear end of the sinker and is enlarged to form the bell 16.

At the forward end of the passage 14 the body of the sinker is cut out to form the recess 17 and at this end also of the passage the material of the sinker is cut away above the passage to form the slot 18 which opens downwardly into the passage.

Extending longitudinally through the passage 14 and the spiral sleeve 15 which lines the passage, is a wire shaft 19 at the forward end of which is formed the eye 20 to which a leader or fishing line may be attached. Slidably mounted upon the shaft between the eye 20 and the adjacent forward edge of the sinker, is a bead 21 which is adapted to be moved back into the recess 17 when the wire shaft is fixed against movement with respect to the sinker.

A portion of the rear end of the wire shaft 19 is bent back upon itself to form the spring arm 22 and the eye 23 at the bend between the arm and the shaft. The forward free end of the arm is offset with respect to the shaft to form the hook 24 which is designed to pass through the passage and the arm 22 is of such length that when the hook is drawn forward through the passage the hook will come out into the recess 17 while the rear end eye 23 remains in the bell-like portion of the spiral sleeve. As will be well understood by those familiar with fishing tackle, when the wire shaft is slipped rearwardly through the passage 14 the arm 22 will be freed from within the passage and may be sprung outwardly away from the shaft so that it may be passed through the eye of a hook which slides down on the arm until it positions within the eye 23. The arm is then pressed back to position adjacent the shaft and the shaft is slipped forwardly so that the hooked end of the arm emerges in the recess 17. When the shaft has been shifted to this position with respect to the weight or sinker body, the free end of the arm is sprung a sufficient distance away from the shaft to permit slipping the bead 21 into position where the hook 24 will engage over it when released. The hook will then be held by the bead a sufficient distance away from the shaft to prevent the hook passing back through the passage and consequently the relative positions of the shaft and the sinker will be fixed and the fishing hook or lure which is attached to the eye 23 cannot then escape.

By engaging the shaft hook 24 in the slot 18 it will be seen that the shaft will be held against turning with respect to the sinker and consequently the fishing hook, lure or other device attached to the rear end of the shaft will be made to maintain a desired position with respect to the sinker.

The shaft eye 23 will be disposed within the enlarged end 16 of the wire coil and thus the swinging movement of the fishing hook, lure or the like will be limited because of its engagement with the end of the coil.

The sinker body at the top and bottom edges thereof is cut out or recessed upon each side as indicated at 25, leaving an intermediate or central web portion 26. At the inner end of this web portion an aperture 27 is formed through which are engaged the ends of a staple 28 which may be employed for the attachment to the sinker, of a spoon 29 or some other element of the fishing tackle such as the weed guard 30.

The rod 19 may also be employed for supporting a spinner in advance of the securing bead 21. Such a spinner is shown and indicated by the reference character 31, attached by a pivot member 32 which is free upon the rod 19 to turn thereabout and to move longitudinally thereon. Between the attaching pivot member 32 and the bead 21 is a bead 33 which forms a bearing against which the member 32 bears.

It will be understood, of course, that the device may be used with or without the spinner 31.

It will also be understood that there may be mounted upon the wire rod 19 at the forward end of the sinker other devices calculated to attract the fish.

While the device has been illustrated in Figures 1 to 4 inclusive, as having a sinker mounted upon the spiral sleeve 15, it is to be understood that the device may be used without the sinker if desired, as illustrated in Figure 6. Also, there may be employed one or more hooks together with the spinner, attached to the wire shaft.

While the preferred form or design for the sinker is as illustrated, I do not wish to be limited to this specific design as it will be readily evident that any other design or shape might be used.

It will be apparent from the foregoing that there is provided in the present invention a novel casting sinker with which is associated means for effecting the easy attachment or detachment of a hook, lure or other auxiliary device and the secure fastening of such device to the sinker so that it cannot become loose when struck by a fish or for any other reason.

I claim:

1. A fishing device of the character stated, comprising a sinker having a passage longitudinally therethrough, a wire rod slidably extended through said passage and having a forward end provided with an eye, a spring arm formed at the rear end of the rod and adapted to be moved into position adjacent to and substantially parallel with an adjacent portion of the rod, means for attaching a hook, lure or the like to said rod, the free end of the arm being adapted to pass through said passage to the forward end of the sinker, and means carried by the rod and adapted to be interposed between the free end of the arm and the rod at the forward end of the sinker to prevent reverse movement of the arm through the passage.

2. A fishing device as set forth in claim 1, in which said means to prevent reverse movement comprises a bead slidable on the rod and in which said arm at its free end is offset from the rod to receive the bead.

3. In fishing tackle, a substantially flat sinker body having a passage therethrough adjacent one edge, a coil spring bell connected with the body and located at one end of the passage, a wire rod extending through the passage and through said bell, means at the bell end of the rod for attaching a hook to the rod, said rod being of materially greater length than the passage and adapted for longitudinal movement therein, the rod when moved forwardly through the passage having the hook attaching means enclosed within the bell, and coacting means between the rod and the sinker which is operative only when the rod is moved forwardly through the passage, to secure the rod against reverse movement in the passage.

4. A device as set forth in claim 3, in which said means includes a locking bead slidably mounted upon the rod at the forward end of the passage and a part attached to and movable relative to the rod between which and the rod the bead is detachably secured.

5. A device as set forth in claim 3, in which the passage is disposed in close proximity to one longitudinal edge of the flat sinker body whereby the major portion of the sinker body lies to one side of the rod.

6. In fishing tackle, a flat sinker body having a passage longitudinally thereof substantially parallel with and adjacent to one longitudinal edge thereof, a relatively long rod extending through said passage and having a forward end provided with a line attaching eye, the rod at its other end having a portion bent back upon itself to form a resilient arm and an eye at the point of bend for connection with a hook, the arm terminating at its free end in an offset bend, the offset bend being outward from the rod, the arm and offset bend with the rod being slidable through the passage either forwardly or rearwardly to the extent that the offset bend may be positioned beyond either end of the passage, and a movable locking member carried upon the rod between the first eye and the adjacent end of the passage and adapted to be inserted between an adjacent portion of the body of the rod and the offset bend to prevent movement of the bend and the rod through the passage.

7. A device of the character stated, comprising a shaft, a spring arm having an eye forming loop integral with an end of the shaft and having a portion bent to offset from the shaft, a sleeve encircling the shaft and adapted to have said spring arm and offset portion extended therethrough, the arm and offset portion being longer than the sleeve, an eye formed at the other end of the shaft, and a member freely slidable on the shaft between the last mentioned eye and the sleeve and adapted to be positioned in said offset portion of the arm when the offset portion is extended through the sleeve to maintain the sleeve in encircling relation with the arm and the portion of the shaft adjacent thereto.

8. A device as set forth in claim 7, in which the sleeve is of enlarged diameter through a portion of its length at the end nearest the eye forming loop and is of spiral form to provide a resilient cage into which the eye forming loop is adapted to position.

9. In fishing tackle, a combined sinker and lure comprising a flat sinker body having two longitudinal edges and having a passage formed longitudinally therethrough adjacent to one longitudinal edge, a relatively long rod member extending through said passage, means at one end of the rod member for attaching a line thereto, means at the other end of the rod member for attaching a hook thereto, said hook attaching means when in operative position lying substantially entirely within the passage, means for securing the rod in one position against longitudinal movement in the passage whereby to maintain the hook holding means within the passage, and means for attaching a lure element to a longitudinal edge of the sinker body, the sinker body being normally maintained in vertical position when in use by reason of the disposition of the rod and passage adjacent to one longitudinal edge of the sinker body.

10. A combined fishing lure and sinker body as set forth in claim 9, in which the said means for attaching a lure element to the sinker body comprises complementary recesses formed in opposite sides of the sinker body whereby to form a relatively thin web on the longitudinal center of the sinker body, and a staple having opposite leg portions each lying within a recess and having parts of the leg portions extended into the web to swingingly couple the staple with the sinker body.

R B WORDEN.

REFERENCES CITED

The following references are of record in the file of this patent:

UNITED STATES PATENTS

| Number | Name | Date |
| --- | --- | --- |
| 2,065,854 | Edel | Dec. 20, 1936 |
| 2,036,954 | Murray | Apr. 7, 1936 |
| 1,923,840 | Ozburn | Aug. 22, 1933 |
| 1,874,102 | Jacobs | Aug. 20, 1932 |
| 1,867,555 | Hildebrandt | July 19, 1932 |
| 1,730,333 | Pflueger | Oct. 1, 1929 |
| 279,206 | Van Altena | June 12, 1883 |